(12) United States Patent
Polikeit et al.

(10) Patent No.: US 10,954,010 B2
(45) Date of Patent: Mar. 23, 2021

(54) PACKAGING APPARATUS AND METHOD (71) Applicant: JT International S.A., Geneva (CH)

(72) Inventors: Michael Polikeit, Schweich (DE); Wolfgang Sevenich, Trier (DE)

(73) Assignee: JT International S.A.

( * ) Notice: Subject to any disclaimer, the term of this patent is extended or adjusted under 35 U.S.C. 154(b) by 1039 days.

(21) Appl. No.: 14/873,374

(22) Filed: Oct. 2, 2015

(65) Prior Publication Data

US 2016/0101883 A1  Apr. 14, 2016

Related U.S. Application Data (63) Continuation of application No. PCT/EP2014/056584, filed on Apr. 2, 2014.

(30) Foreign Application Priority Data

Apr. 3, 2013  (EP) ..................... 13162140

(51) Int. Cl.
*B65B 19/22* (2006.01)
*B29C 65/18* (2006.01)
(Continued)

(52) U.S. Cl.
CPC .............. *B65B 19/22* (2013.01); *B29C 65/18* (2013.01); *B29C 65/7882* (2013.01);
(Continued)

(58) Field of Classification Search
CPC ............ B29C 65/2015; B29C 65/7885; B29C 66/818; B29C 66/3472; B29C 66/4322;
(Continued)

(56) References Cited

U.S. PATENT DOCUMENTS 2,079,328 A * 5/1937 McBean ................ B65D 75/66
206/449
2,195,222 A * 3/1940 Neumair ................ B65B 19/26
138/128
(Continued)

FOREIGN PATENT DOCUMENTS

CN    1203149     12/1998
CN    1556767 A   12/2004
(Continued)

OTHER PUBLICATIONS

International Search Report for International Patent Application No. PCT/EP20147056584 dated May 23, 2014.
(Continued)

*Primary Examiner* — Robert F Long
*Assistant Examiner* — Eduardo R Ferrero
(74) *Attorney, Agent, or Firm* — Lerner, David, Littenberg, Krumholz & Mentlik, LLP (57) ABSTRACT

A packaging apparatus, in particular for packaging smoking articles, includes a wrapping device for wrapping a barrier film around an item to be packaged, such as a pack of smoking articles; and at least one sealing head having a contact surface for contacting the barrier film wrapped around the item and sealing the barrier film along a seam to form a protective enclosure around the item. The contact surface of the sealing head is at least partially discontinuous to provide a non-sealing region in the sealing head. In this way, the non-sealing region can be positioned to at least partially, and preferably wholly, overlie a frangible part or strip provided in the barrier film.

16 Claims, 3 Drawing Sheets (51) Int. Cl.
    *B29C 65/00*         (2006.01)
    *B65B 51/22*         (2006.01)
    *B65B 61/18*         (2006.01)
    *B65B 11/28*         (2006.01)
    *B65B 51/14*         (2006.01)
    *B29C 65/78*         (2006.01)
    *B65D 85/10*         (2006.01)
    *B29C 65/30*         (2006.01)
    *B29L 31/00*         (2006.01)
    *B29K 23/00*         (2006.01)
    *B29K 105/00*        (2006.01)

(52) U.S. Cl.
    CPC ........ B29C 66/1122 (2013.01); B29C 66/232 (2013.01); B29C 66/3472 (2013.01); B29C 66/4322 (2013.01); B29C 66/474 (2013.01); B29C 66/496 (2013.01); B29C 66/818 (2013.01); B29C 66/8145 (2013.01); B29C 66/81413 (2013.01); B29C 66/81419 (2013.01); B29C 66/81431 (2013.01); B29C 66/81465 (2013.01); B29C 66/843 (2013.01); B29C 66/849 (2013.01); B29C 66/8432 (2013.01); B65B 11/28 (2013.01); B65B 51/14 (2013.01); B65B 51/22 (2013.01); B65B 61/182 (2013.01); B65D 85/1027 (2013.01); *B29C 65/30* (2013.01); *B29C 66/348* (2013.01); *B29C 66/71* (2013.01); *B29K 2023/12* (2013.01); *B29K 2105/256* (2013.01); *B29L 2031/712* (2013.01); *B29L 2031/7416* (2013.01)

(58) Field of Classification Search
    CPC ........ B29C 66/81413; B29C 66/81431; B29C 65/18; B29C 65/30; B29C 66/81425; B29C 66/81427; B29C 66/81423; B29C 66/81415; B29C 66/81433; B29C 66/1122; B29C 66/232; B29C 66/348; B29C 66/474; B29C 66/496; B29C 66/71; B29C 66/8145; B29C 66/81465; B65B 11/28; B65B 19/22; B65B 61/182; B65B 51/14; B65B 51/22; B29L 2031/712; B29L 2031/7416; B29K 2023/12; B29K 2105/256; B65D 85/1027
    USPC .............. 53/371.2, 374.2, 234, 133; 156/581
    See application file for complete search history.

(56) References Cited

U.S. PATENT DOCUMENTS

| | | | | |
|---|---|---|---|---|
| 2,308,197 A * | 1/1943 | Meyer | .................... | B65D 75/68 |
| | | | | 206/497 |
| 2,334,381 A * | 11/1943 | Bronander | .............. | B31B 50/00 |
| | | | | 229/203 |
| 2,651,350 A * | 9/1953 | Casey | ................. | B29C 66/1122 |
| | | | | 156/583.4 |
| 2,875,070 A * | 2/1959 | Rockland | ................ | B65B 31/06 |
| | | | | 426/106 |
| 3,257,256 A * | 6/1966 | Lehmacher | ............... | B26F 3/06 |
| | | | | 156/495 |
| 3,566,752 A * | 3/1971 | Dreher | ................ | B31B 50/00 |
| | | | | 156/260 |
| 3,586,821 A * | 6/1971 | Buob | .................. | B29C 66/1122 |
| | | | | 219/243 |
| 3,624,836 A * | 11/1971 | Rohdin | ................... | B29C 65/18 |
| | | | | 219/243 |
| 3,817,816 A * | 6/1974 | Watt | ..................... | B29C 66/131 |
| | | | | 156/583.4 |
| 4,053,046 A * | 10/1977 | Roark | .................... | B65D 75/68 |
| | | | | 206/274 |
| 4,070,513 A * | 1/1978 | Rhoads | ................. | B29C 63/426 |
| | | | | 156/290 |
| 4,330,977 A * | 5/1982 | Focke | .................... | B29C 65/18 |
| | | | | 53/371.7 |
| 4,369,611 A * | 1/1983 | Canfield | ................. | B29C 65/18 |
| | | | | 53/79 |
| 4,374,697 A * | 2/1983 | Tsuzuki | .................. | B29C 65/08 |
| | | | | 156/580.2 |
| 4,526,314 A * | 7/1985 | Reil | ....................... | B65D 5/445 |
| | | | | 229/106 |
| 4,586,317 A * | 5/1986 | Bussell | .................... | B29C 65/18 |
| | | | | 53/451 |
| 4,638,911 A * | 1/1987 | Prohaska | ............... | B65D 75/66 |
| | | | | 206/484 |
| 4,704,509 A * | 11/1987 | Hilmersson | ............ | B29C 65/18 |
| | | | | 219/633 |
| 5,154,035 A | 10/1992 | Cavazza | | |
| 5,247,779 A * | 9/1993 | Wirsig | ................. | B29C 66/7373 |
| | | | | 53/373.7 |
| 5,462,166 A * | 10/1995 | Minton | .............. | B29C 66/81422 |
| | | | | 206/440 |
| 5,649,407 A * | 7/1997 | Blomqvist | .......... | B29C 65/3656 |
| | | | | 53/373.7 |
| 5,694,738 A * | 12/1997 | Shigeta | .................... | B65B 11/30 |
| | | | | 53/228 |
| 5,701,725 A * | 12/1997 | Neri | ..................... | B29C 65/1654 |
| | | | | 219/121.63 |
| 5,806,281 A * | 9/1998 | Krul | ....................... | B65D 75/66 |
| | | | | 53/412 |
| 5,931,292 A | 8/1999 | Focke et al. | | |
| 5,968,399 A * | 10/1999 | Selberg | ............... | B29C 65/3656 |
| | | | | 156/272.2 |
| 5,976,315 A * | 11/1999 | Martin | .................... | B29C 65/08 |
| | | | | 156/580.2 |
| 5,993,593 A * | 11/1999 | Swartz | .................. | B29C 65/226 |
| | | | | 156/282 |
| 6,042,681 A * | 3/2000 | Draghetti | ............... | B29C 65/008 |
| | | | | 156/273.1 |
| 6,155,030 A * | 12/2000 | Inoue | ...................... | B29C 65/18 |
| | | | | 53/374.2 |
| 6,189,296 B1 * | 2/2001 | Spatafora | ................ | B65B 11/28 |
| | | | | 53/228 |
| 6,254,707 B1 * | 7/2001 | Sfikas | ................... | B29C 65/743 |
| | | | | 156/251 |
| 6,265,002 B1 * | 7/2001 | Blatter | ...................... | B29C 66/80 |
| | | | | 426/108 |
| 8,826,633 B2 * | 9/2014 | Buse | ......................... | B65B 19/20 |
| | | | | 53/375.9 |
| 9,272,800 B2 * | 3/2016 | Draghetti | ............. | B65B 19/223 |
| 2002/0139084 A1 * | 10/2002 | Tobolka | ................ | B29C 65/224 |
| | | | | 53/374.8 |
| 2005/0050851 A1 | 3/2005 | Osgood | | |
| 2005/0145317 A1 * | 7/2005 | Yamamoto | ........ | B29C 66/91431 |
| | | | | 156/73.5 |
| 2006/0072858 A1 * | 4/2006 | Kurosawa | ............... | B29C 65/18 |
| | | | | 383/44 |
| 2008/0092483 A1 | 4/2008 | Osgood | | |
| 2008/0172989 A1 * | 7/2008 | Deep | ........................ | B65B 9/02 |
| | | | | 53/451 |
| 2009/0113851 A1 * | 5/2009 | Carr | .................... | B29C 66/81427 |
| | | | | 53/478 |
| 2012/0005993 A1 * | 1/2012 | Doll | ...................... | B29C 66/344 |
| | | | | 53/477 |
| 2013/0068376 A1 * | 3/2013 | Kuwahara | ........... | B29C 65/3676 |
| | | | | 156/219 |

FOREIGN PATENT DOCUMENTS

| | | |
|---|---|---|
| CN | 1639025 A | 7/2005 |
| EP | 0 463 300 A2 | 1/1992 |
| EP | 0 463 360 A1 | 1/1992 |
| EP | 0 970 889 A1 | 1/2000 |
| JP | H03032066 U | 3/1991 |
| JP | H08217005 A | 8/1996 |

(56) References Cited

FOREIGN PATENT DOCUMENTS

| JP | 2002337819 A | 11/2002 |
|----|---|---|
| WO | WO 03/072455 A1 | 9/2003 |
| WO | WO 2007/113066 A1 | 10/2007 |

OTHER PUBLICATIONS

First Office Action for Chinese Patent Application No. 2014800317594 dated June 23, 2016.

* cited by examiner

PACKAGING APPARATUS AND METHOD

CROSS-REFERENCE TO RELATED APPLICATIONS

This application is a continuation of and claims priority to PCT/EP2014/056584 filed Apr. 2, 2014 which claims the benefit of and priority to European Patent Application No. 13 162140.1 filed Apr. 3, 2013, the entire disclosures of which are incorporated by reference herein.

TECHNICAL FIELD

The present disclosure relates to a packaging apparatus and to a method for packaging an item, such as a pack of cigarettes, cigarillos, cigars or the like, which for the sake of brevity and clarity will simply be collectively referred to herein as "smoking articles". The disclosure herein also relates to a packaged item, such as a pack of smoking articles, which is produced by such an apparatus or method.

BACKGROUND

A pack of smoking articles, e.g. cigarette pack, is typically produced in a packing process in which a container is formed around a charge of the smoking articles. After the packing process, the packs are finally wrapped and sealed with a barrier film that is designed both to protect against external influences, such as moisture, and also to retain aroma and to maintain the freshness of the smoking articles. The barrier film is typically a flexible sheet, which is preferably transparent and may be formed of cellophane, polypropylene, or another similar synthetic film material, with the barrier film typically being heat-shrunk, heated and bonded around the pack.

The barrier film can be configured to tear or break along a line to enable a consumer to access the smoking articles in the pack after purchase. In this regard, the line may be a line of weakness formed in the barrier film material, e.g. by scoring, or a line that follows a tear tape adhered to the barrier film. A tab or flap is typically located at an end of the line to allow a user to initiate the tearing or breaking of the barrier film. However, it has been found that bonding or sealing of the barrier film can interfere with the line of weakness. In particular, the tab or flap may stick to the barrier film such that the usual ease of tearing or breaking the film is compromised, making it more difficult for a consumer to remove the barrier film and access the smoking articles.

SUMMARY

In view of the above, one idea of the present disclosure is to provide an improved apparatus and method for packaging items, such as smoking articles, which addresses the above problems. Another idea of the disclosure herein is also to provide a correspondingly improved pack of smoking articles.

According to one aspect, therefore, the disclosure herein provides a packaging apparatus, particularly for packaging smoking articles, which comprises a wrapping device for wrapping a barrier film around an item to be packaged, such as a pack of smoking articles; and at least one sealing head having a contact surface for contacting the barrier film wrapped around the item and for sealing the barrier film along a seam to form a protective enclosure around the item, wherein the contact surface of the sealing head is at least partially discontinuous to provide a non-sealing region in the sealing head.

As noted above, in the present disclosure the barrier film is provided with a line or area of weakness (e.g. a frangible or breakable line or strip) which assists removal of the film and access to the item by the consumer. With the present disclosure, therefore, the sealing head can be arranged during bonding or sealing of the barrier film such that the non-sealing region at least partially, and preferably wholly, overlies the line or area of weakness in the film. In this way, the sealing head is able to perform the required bonding of the barrier film without negatively affecting a frangible or breakable line or strip in the film.

In one embodiment, the wrapping device is configured to wrap the barrier film around the item to be packaged such that an area of overlap of the barrier film is provided where the sealing head contacts and seals the barrier film along the seam. This area of overlap of the barrier film may be formed, for example, by overlapping edge portions of the film and/or by folded edge portions of the film.

In another embodiment, the sealing head includes heating or a heater for heating the contact surface to effect sealing of the barrier film along the seam by heat bonding or fusion, i.e. as the sealing head contacts the film wrapped around the item. In this regard, the non-sealing region makes no contact with the barrier film and thus effectively performs little or no heat bonding or fusion, and so does not comprise the frangible or breakable line or area of the film positioned in that region. Alternatively, the sealing may be achieved by adhesive bonding via pressure exerted by the sealing head over the contact surface. In that case, the non-sealing region has no contact with and exerts no pressure on the barrier film, which in this specific non-sealing region is desirably also free from adhesive. Thus, adhesive bonding in this region can be avoided.

In a further embodiment, the sealing head has a generally elongate form and the non-sealing region may be provided as an intermediate region transverse to a longitudinal extent of the sealing head. In this regard, the non-sealing region may extend across at least 50 percent, preferably at least 75 percent, and more preferably at least 90 percent, of a full width of the sealing head. In one particular embodiment, the contact surface of the sealing head is fully discontinuous in the longitudinal direction such that the non-sealing region extends across the full width of the sealing head. However, in an alternative embodiment, the contact surface may be only partially discontinuous (and thus also partially continuous) in the longitudinal direction, so that the non-sealing region does not extend across the full width of the sealing head. In particular, the contact surface may span less than 25 percent (preferably equal to or less than 10 percent) of the width of the sealing head adjacent the non-sealing region. By ensuring that the seam is continuous at least in a small region, the barrier film can better protect against external influences, such as moisture, and also better retain aroma and maintain the freshness of the smoking articles. The continuous region is preferably at a periphery or edge portion of the seam, but may equally be in a middle or intermediate portion thereof.

In a further embodiment, the geometry of the non-sealing region varies in two or in three dimensions. For example, the geometry of the non-sealing region may vary in the plane of the contact surface of the sealing head. More particularly, a breadth of the non-sealing region may vary (for example, linearly or in stepped fashion) across a width of the sealing head. Thus, where an activator, such as a tab or flap, is provided on or in the barrier film to be operated (e.g. grasped and pulled) by a user to activate or to break the line or area of weakness in the film, the sealing head may be arranged such that a broader part of the non-sealing region overlies the tab or flap when the barrier film is sealed or heat-bonded along the seam. The non-sealing region is preferably formed by a recess or cavity in the sealing head. Thus, as an alternative, or in addition to the variation in geometry of the non-sealing region in the plane of the contact surface, a height or depth of the recess or cavity (i.e. normal to the contact surface) may vary across a width of the sealing head. In this way, the amount of radiant heat imparted to the barrier film by the sealing head in the non-sealing region may also be regulated.

In a further embodiment, the wrapping device comprises a holder, preferably in the form of a rotatable carousel, for holding one or more of the the item to be packaged and for transporting the item(s) wrapped in the barrier film to the sealing head. The sealing head is preferably movable relative to the holder to contact the barrier film wrapped around a respective item and to seal the barrier film along the seam. In the case of the holder being a rotatable carousel, the wrapped items to be packaged are transported by rotating the carousel about its axis, and the sealing head may be movable in a radial direction relative to the carousel to contact and seal the barrier film along the seam.

In a further embodiment, the apparatus includes at least two sealing heads, each of which is configured to form a portion of the seam in the barrier film wrapped around the item to be packaged. In this regard, the sealing heads are preferably configured to engage the item separately and consecutively. The two sealing heads may, for example, be located spaced apart from one another around a periphery of the holder or carousel to engage each item separately and consecutively. Each of the sealing heads may thus have a non-sealing region, and the respective non-sealing regions may have different shapes or configurations, which together may cooperate and/or complement each other in forming the seam.

In a further embodiment, the item to be packaged comprises a pack of smoking articles, which includes a charge of the smoking articles themselves supported on or in a frame of rigid or semi-rigid material, such as cardboard, stiffened paper, paperboard, fibreboard, polymer sheet material, or the like. While the rigid or semi-rigid material of the frame may be relatively flexible, regardless of its composition it should nevertheless also be dimensionally stable in order to impart structural stability to the pack of smoking articles, and thereby to protect the smoking articles from damage (such as inadvertent compression or crushing) during transport and storage. Thus, the charge of smoking articles and the frame are wrapped or enclosed with the barrier film by sealing overlapping portions of the barrier film together to form one or more seams.

According to another aspect, the disclosure herein provides a method of packaging an item, such as a pack of smoking articles, comprising the steps of: providing a barrier film for wrapping around an item to be packaged, the barrier film including a frangible line or part; wrapping the barrier film around the item to be packaged; providing at least one sealing head having a contact surface for sealing the barrier film, wherein the contact surface is at least partially discontinuous to provide a non-sealing region in the sealing head; and contacting the barrier film wrapped around the item with the sealing head to seal the barrier film along a seam, whereby the non-sealing region is positioned to at least partially, and preferably substantially wholly, overlie the frangible line or part of the barrier film.

In one embodiment, the method includes the step of heating the contact surface of the sealing head to effect sealing of the barrier film along the seam by heat bonding or fusion. Further, the step of contacting the barrier film with the sealing head preferably includes exerting pressure on the barrier film over the contact surface of the sealing head.

In another embodiment, the frangible line or part of the barrier film includes one or more lines of weakness, such as a score line or line of perforations, and may further include an activator, such as a tab or flap, provided on or in the barrier film to be operated (e.g. grasped and pulled) by a user to activate or to break the frangible line or part (e.g. the line or area of weakness). In this regard, the non-sealing region is desirably positioned to at least partially, and more preferably fully, overlie the activator (e.g. the tab or flap).

According to a further aspect, the present disclosure provides a packaged item, such as a pack of smoking articles, which is produced by the apparatus and/or method of the disclosure herein as described with respect to any one of the embodiments above.

Thus, the disclosure herein also provides a packaged item, such as a pack of smoking articles, with an outer wrapping comprising a barrier film that is sealed along a seam to form a protective enclosure around the item. The barrier film has a frangible part or strip and a tab for activating the frangible part or strip, wherein the seam extends across the frangible part or strip and the seam does not overlie the tab.

In a further embodiment, the frangible part or strip in the flexible barrier film includes at least one line of weakening such as a score line or a line of perforations, and the seam is at least partially discontinuous where it crosses the frangible part or strip of the film.

In another aspect, therefore, the present disclosure provides a packaged item, such as a pack of smoking articles, with an outer wrapping comprising a barrier film that is sealed along a seam to form a protective enclosure around the item. The barrier film includes a frangible line or part and the seam extends across the frangible line or part, the seam being at least partially discontinuous where it crosses the frangible line or part of the film. In this discontinuous region of the seam, the barrier film is typically not sealed.

In one embodiment, the seam is discontinuous over at least 50 percent, more preferably over at least 75 percent, and even more preferably over about 90 percent, of a full width of the seam, i.e. transverse to a longitudinal extent of the seam. In a further embodiment, the seam is sealed over at least a portion of its width; preferably at least about 10 percent of its width.

BRIEF DESCRIPTION OF THE DRAWINGS

For a more complete understanding of the disclosure herein and the advantages thereof, exemplary embodiments of the disclosure herein are explained in more detail in the following description with reference to the accompanying drawing figures, in which like reference characters designate like parts and in which.

DETAILED DESCRIPTION

The accompanying drawings are included to provide a further understanding of the present disclosure and are incorporated in and constitute a part of this specification. The drawings illustrate particular embodiments of the disclosure herein and together with the description serve to explain the principles of the disclosure herein. Other embodiments of the disclosure herein and many of the attendant advantages of the disclosure herein will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
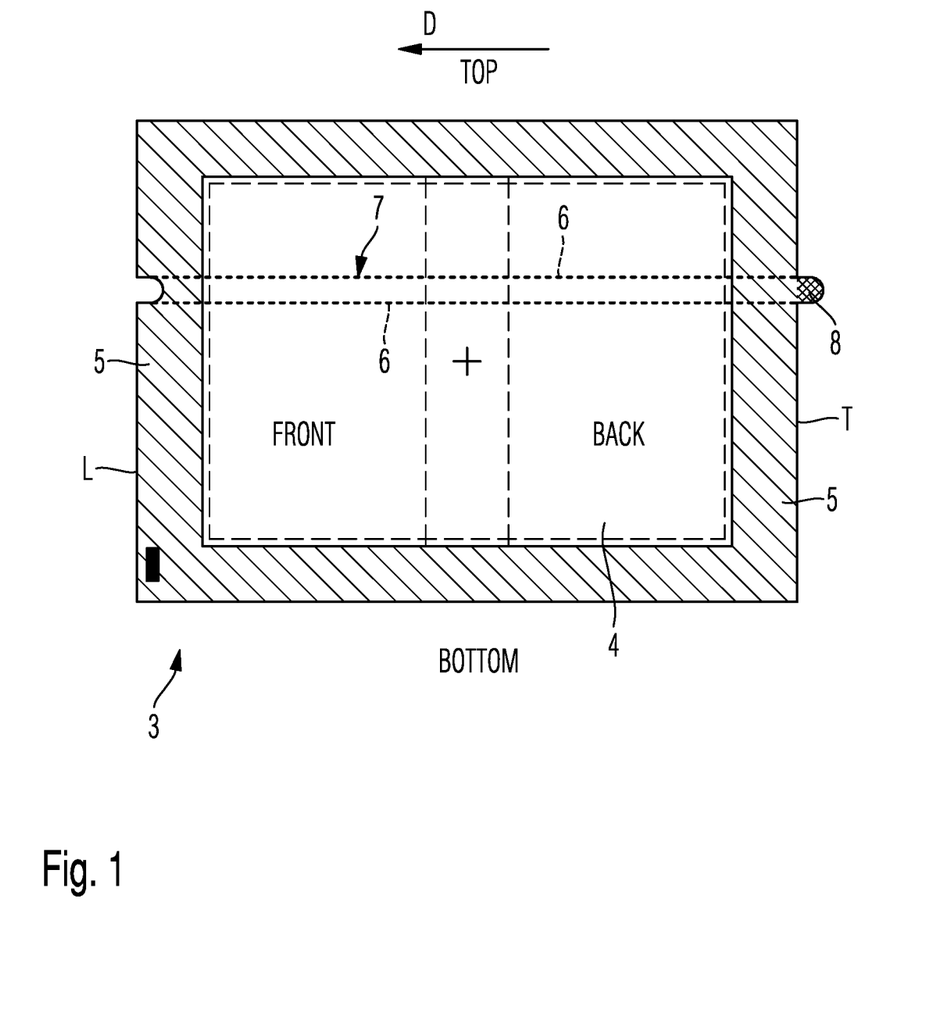
FIG. 1 shows a plan view of a flat sheet of barrier film for use in packaging smoking articles according to an embodiment.
Figure 2:
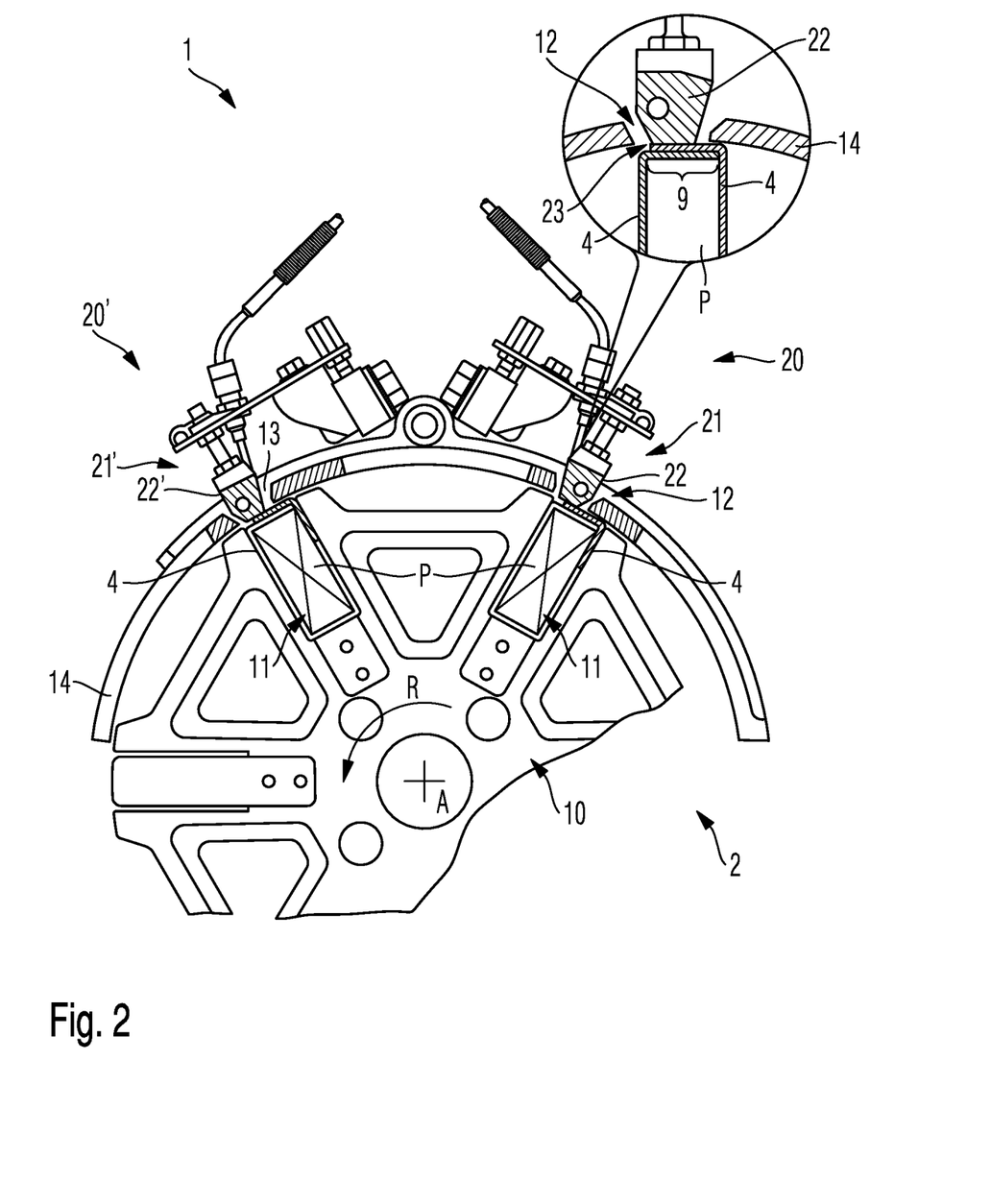
FIG. 2 shows a side view of an apparatus for packaging smoking articles according to an embodiment.

Referring to drawing FIGS. 1 and 2, a packaging apparatus 1 according to a preferred embodiment of the disclosure herein can be partially seen in side view in FIG. 2. The apparatus 1 includes a wrapping device 2 which is configured to wrap a sheet 3 of barrier film 4 around an item P to be packaged. The sheet 3 of barrier film in this particular embodiment is explicitly illustrated in FIG. 1 as a generally rectangular sheet, which is specifically designed to be wrapped around a generally rectangular pack P of cigarettes, cigarillos or other such smoking articles by the wrapping device 2. In this regard, FIG. 1 identifies those portions of the barrier film sheet 3 which correspond to the "front" and "back" faces of the pack P of smoking articles. Furthermore, a peripheral outer region 5 of the barrier film sheet 3, which is cross-hatched or shaded, denotes the portions of the sheet 3 that overlap after the pack P has been wrapped with the film.

As seen in FIG. 1, the sheet 3 of barrier film 4 includes two lines 6 of perforations and/or scoring which extend parallel to one another across a width of the sheet 3 to form a frangible or tearable strip 7 in the barrier film. In this regard, a tab or flap 8 is provided at one end region of this frangible strip 7 as an activator for a user to grasp and pull for activating the frangible strip 7 and thereby breaking the barrier film 4 along the lines 6 of perforations and/or scoring.

The individual sheet 3 of barrier film 4 illustrated in FIG. 1 of the drawings may be provided in a continuous roll of barrier film material that includes a plurality of such sheets 3 joined to one another in series along respective leading and trailing edges thereof L, T with reference to a travel direction (as indicated by the arrow "D") for the film being fed from a bulk roll into the wrapping device 2 of the packaging apparatus 1. Some typical dimensions for the sheet 3 of barrier film 4 are specifically denoted in millimetres in FIG. 1 for application to a typical pack P of smoking articles. It will be appreciated by persons skilled in the art, however, that such dimensions are merely indicative of one particular embodiment of the disclosure herein and that these dimensions may differ in other embodiments without influencing the inventive concept. The barrier film 4 in this example is preferably comprised of transparent polypropylene material, with the lines of weakness 6 preferably being pre-formed in the film 4 by laser perforation and/or scoring. Alternatively, the barrier film 4 may include a tear-tape and the lines of weakness 6 may be formed along the longitudinal edges of the tear-tape.

With reference again to FIG. 2 of the drawings, the wrapping device 2 comprises a holder 10 provided in the form of a rotatable carousel for holding and transporting a plurality of the packs P, each of which has been wrapped with a sheet 3 of barrier film 4. In this regard, the carousel 10 is mounted for rotation about a central axis A and includes a plurality of bays or recesses 11 spaced apart around a periphery of the carousel 10 for respectively receiving and holding a single pack P of smoking articles wrapped with a corresponding sheet 3 of the barrier film 4. From the perspective of FIG. 2, the "bottom" ends of the respective packs P with their folded and overlapped portions 5 of the sheet 3 of barrier film 4 face out of the page.

Referring further to FIG. 2, the packaging apparatus 1 can be seen to include two sealing stations 20, 20', each of which has a sealing head 21, 21' for sealing the sheet 3 of barrier film 4 (e.g. via heat bonding or fusion) around the respective packs P. In particular, as shown in the detail enlargement of FIG. 2, sealing head 21 includes an elongate sealing member 22 (shown in cross-section) having a contact surface 23 for contacting the overlapped portions 5 of the barrier film 4 along a radially outwards facing side edge of the pack P held in the bay or recess 11 of the carousel 10. The sealing head 21 typically includes a heater (e.g. an electric heating element, not shown) for heating the sealing member 22 such that the contact surface 23 seals or fuses the barrier film 4 along a seam 9 over the length of the side edge of the pack P and the barrier film 4 provides a protective enclosure around the pack. In this connection, the carousel 10 transports the packs P held in the respective bays or recesses 11 to each of two sealing stations 20, 20' by rotation in the direction R about the axis A. In each of the sealing stations 20, 20' the side edges of the packs P are aligned with a respective slot 12, 13 formed in a curved, stationary cover plate 14 around the carousel 10. The carousel 10 then pauses with the packs P in these positions to enable the sealing head 21, 21' to move radially inwards through the slots 12, 13 to engage and seal the barrier film 4 via the contact surfaces 23, 23'.

Figure 3A:
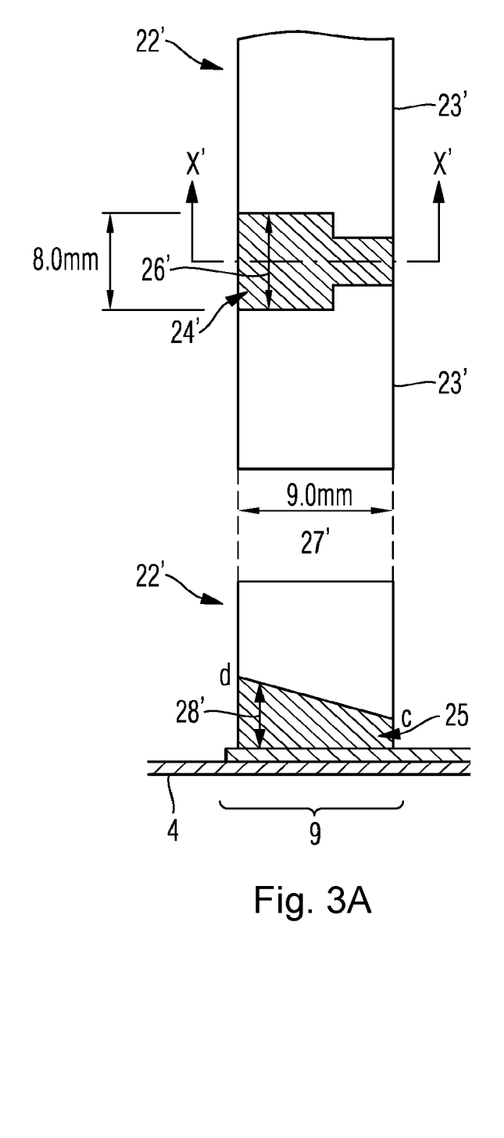
FIGS. 3A and 3B show plan and cross-sectional views of sealing members for the packaging apparatus in FIG. 2.
Figure 3B:
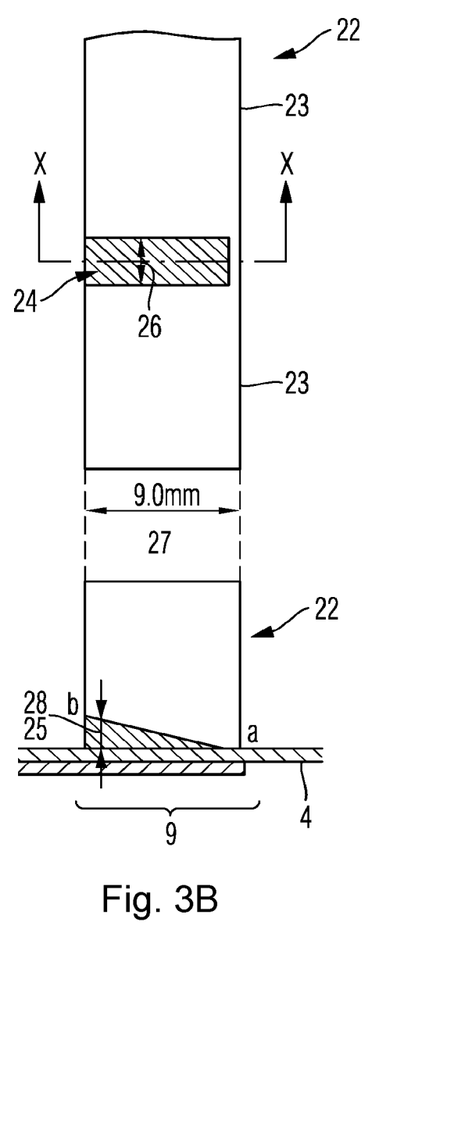

Referring now to drawing FIGS. 3A and 3B, the sealing members 22, 22' of the sealing heads 21, 21' are illustrated in more detail. The upper part of FIGS. 3A and 3B show the contact surface 23, 23' of each respective sealing member 22, 22' in plan or bottom view (i.e. in a radial direction with respect to the axis A of carousel 10). Each of the contact surfaces 23, 23' has a non-sealing region 24, 24' which extends across a width of the respective sealing member 22, 22' transverse to its longitudinal extent. In this regard, the non-sealing regions 24, 24' are denoted by cross-hatching and are formed by a respective recess or cavity 25, 25' in the face of each of the sealing members 22, 22'. Thus, each of the non-sealing regions 24, 24' forms an at least partial discontinuity in the contact surface 23, 23' of the respective sealing head 21, 21'. For the purposes of clarity, the two sealing stations 20, 20' will be referred to in the following description as the first sealing station 20 and the second sealing station 20', respectively. The various parts of the first and second sealing stations 20, 20' will also be denoted by the terms "first" and "second", where this seems appropriate to enhance the clarity of description.

In the first sealing head 21, for example, the non-sealing region 24 is of substantially uniform or constant breadth 26 and extends across approx. 90 percent of a width 27 of the first sealing member 22. In so doing, the contact surface 23 of the first sealing head 21 maintains a narrow band or strip of continuity (i.e. approx. 10 percent of an overall width 27 of the contact surface 23) at the right-hand side of first sealing member 22 as seen in FIG. 3B.

By contrast, the non-sealing region 24' of the second sealing head 21' extends transversely across the full width 27' of the second sealing member 22' to render the contact surface 23' fully discontinuous in this region. Furthermore, the breadth 26' of the non-sealing region 24' also varies in the plane of the contact surface 23' in a stepped fashion between a narrower breadth at the right-hand side and a greater breadth at the left-hand side as shown in FIG. 3A.

Referring further to FIGS. 3A and 3B, the lower part of the drawings show the sealing members 22, 22' of the first and second sealing heads 21, 21' in cross-sections taken in directions X-X and X'-X' in a plane perpendicular to the axis A of the carousel 10. In this way, the geometry of the non-sealing regions 24, 24' of the respective first and second sealing heads 21, 21' can be seen to vary in three dimensions. Thus, when the contact surface 23 of the first sealing head 21 is in contact with the barrier film 4 overlapping along the side edge region of the pack P of smoking articles, the area denoted "a" at the right-hand side of the first sealing member 22 is in direct contact with the barrier film 4, whereas the part denoted "b" is somewhat spaced from (e.g. by 0.1 mm) and does not contact the barrier film 4. Indeed, the entire non-sealing region 24 does not contact the barrier film 4 and therefore does not contribute to the formation of the seam 9. The greater a height 28 of the recess or cavity 25 forming the non-sealing region 24, the greater the distance between the first sealing member 22 and the barrier film 4 in the non-sealing region 24 and the less the radiant heat which emanates from the sealing member 22 may negatively impact upon the barrier film in that non-sealing region. Regarding the second sealing head 21', it is apparent that the second sealing member 22 is even further spaced (i.e. due to height 28' of the cavity 25') from the barrier film 4 in the non-sealing region 24'. At the right-hand side denoted by "c", the spacing may be about 0.1 mm, whereas this increases approximately linearly over the width 27' of the second sealing member 22' to about 0.2 mm at the side denoted by "d". It will be noted here that while the heights 28, 28' are represented in FIGS. 3A and 3B as varying across the widths 27, 27' of the sealing members 22, 22', respectively, they could also be of substantially constant value across the widths 27, 27' of the sealing members 22, 22' without significantly altering the sealing performance of the sealing members.

By arranging the first and second sealing members 22, 22' so that the non-sealing regions 24, 24' thereof are aligned with the frangible strip 7 in the sheet 3 of barrier film 4 at each of the respective sealing stations 20, 20', the barrier film 4 can be sealed or heat bonded along the seams 9, 9' at the side edge of the pack P without negatively or adversely affecting subsequent operation of the frangible strip 7 by a user. That is, by configuring the sealing members 22, 22' in this way, the first and second sealing heads 21, 21' ensure that a desirable seal is created along the seams 9, 9' while the non-sealing regions 24, 24' simultaneously ensure that frangible strip 7 in the sheet 3 of barrier film 4 retains its operational efficacy. In this regard, the second sealing head 20' is preferably arranged such that the broader part of the non-sealing region 24' overlies the tab or flap 8 of the frangible strip 7, thereby ensuring that the activator is least affected by the heat sealing or bonding of the barrier film 4 and thereby also ensuring proper commencement to the activation of the frangible strip 7.

Although specific embodiments of the disclosure herein have been illustrated and described herein, it will be appreciated by those of ordinary skill in the art that a variety of alternative and/or equivalent implementations exist. In this regard, it will be noted that the shape of the item P to be packaged is not critical to the disclosure herein. Cigarette packs will typically have a rectangular shape, but other shapes are also conceivable.

It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. For example, while the specific embodiments described with respect to FIGS. 3A and 3B involve two sealing members 22, 22' forming two parallel seams 9, 9' along the side of the pack P, it will be appreciated that the apparatus 1 and method of the disclosure herein may also include a single sealing head 21 with one sealing member 22 to form a single seam 9 along the side of each item or pack P. Generally, this application is intended to cover any adaptations or variations of the specific embodiments discussed herein.

Also, it will be appreciated that in this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

While at least one exemplary embodiment of the present disclosure(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A packaging apparatus comprising:
a wrapping device for wrapping a barrier film around an item to be packaged; and
a sealing head having a contact surface for contacting the barrier film wrapped around the item and sealing the barrier film along a seam to form a protective enclosure around the item, the contact surface extending within a plane having a width direction and a breadth direction perpendicular to the width direction,
wherein the contact surface of the sealing head is at least partially discontinuous in the breadth direction to provide a non-sealing region of the sealing head, and a breadth of the non-sealing region in the breadth direction varies across the width direction of the contact surface, and
wherein the non-sealing region of the sealing head defines a recess extending into the sealing head below the contact surface in a depth direction perpendicular to the plane of the contact surface, and a depth of the recess in the depth direction varies in a continuously increasing or continuously decreasing manner across the width direction of the contact surface,
wherein the wrapping device comprises a carousel for holding a plurality of items to be packaged and for transporting the items wrapped with the barrier film to the sealing head by rotating the carousel about its axis, wherein the sealing head is movable in a radial direction relative to the carousel to contact the barrier film wrapped around a respective item and to seal the barrier film along the seam.

2. The apparatus according to claim 1, wherein the sealing head includes a heater for heating the contact surface to effect sealing of the barrier film along the seam by heat bonding or fusion, whereby the non-sealing region has substantially no contact with the barrier film.

3. The apparatus according to claim 1, wherein the sealing head is elongate and the non-sealing region is an intermediate region transverse to a longitudinal extent of the sealing head.

4. The apparatus according to claim 1, wherein the non-sealing region extends across at least 50 percent of a full width of the sealing head.

5. The apparatus according to claim 4, wherein the non-sealing region extends across a full width of the sealing head.

6. The packaging apparatus according to claim 4, wherein the non-sealing region extends across at least 75 percent of the full width of the sealing head.

7. The packaging apparatus according to claim 6, wherein the non-sealing region extends across at least 90 percent of the full width of the sealing head.

8. The apparatus according to claim 1, wherein the breadth of the non-sealing region varies linearly or in stepped fashion, across a width of the sealing head.

9. The apparatus according to claim 1, wherein the sealing head is a first sealing head, the apparatus further comprising a second sealing head, each sealing head being configured to form a portion of the seam in the barrier film wrapped around the item, wherein the first and second sealing heads are configured to engage the item separately and consecutively.

10. The apparatus according to claim 9, wherein the first and second sealing heads are arranged spaced apart from one another around a periphery of the carousel to engage each item separately and consecutively, wherein each of the sealing heads has a non-sealing region, the non-sealing regions having different shapes or configurations.

11. The packaging apparatus according to claim 1, wherein the item to be packaged comprises a pack of smoking articles.

12. A method of packaging an item, such as a pack of smoking articles, comprising:
providing a barrier film for wrapping around an item to be packaged, the barrier film including a frangible part or strip;
providing a wrapping device for wrapping the barrier film around the item to be packaged;
providing a sealing head which has a contact surface for sealing the barrier film, the contact surface extending within a plane having a width direction and a breadth direction perpendicular to the width direction, wherein the contact surface is at least partially discontinuous in the breadth direction to provide a non-sealing region of the sealing head, and a breadth of the non-sealing region in the breadth direction varies across the width direction of the contact surface; and
contacting the barrier film wrapped around the item with the sealing head to seal the barrier film along a seam, whereby the non-sealing region is positioned to at least partially overlie the frangible part or strip,
wherein the non-sealing region of the sealing head defines a recess extending into the sealing head below the contact surface in a depth direction perpendicular to the plane of the contact surface, and a depth of the recess in the depth direction varies in a continuously increasing or continuously decreasing manner across the width direction of the contact surface,
wherein the wrapping device comprises a carousel for holding a plurality of items to be packaged and for transporting the items wrapped with the barrier film to the sealing head by rotating the carousel about its axis, wherein the sealing head is movable in a radial direction relative to the carousel to contact the barrier film wrapped around a respective item and to seal the barrier film along the seam.

13. The method according to claim 12, including the step of heating the contact surface of the sealing head to effect sealing of the barrier film along the seam by heat bonding or fusion.

14. The method according to claim 12, wherein the frangible part or strip in the flexible barrier film comprises one or more lines of weakening, and a tab for activating the frangible part or strip, wherein the non-sealing region is positioned to at least partially overlie the tab.

15. The method according to claim 14, wherein the frangible part or strip in the flexible barrier film comprises a score line or line of perforations.

16. The method according to claim 14, wherein the non-sealing region is positioned to substantially fully overlie the tab.

* * * * *